United States Patent [19]
Takanohashi et al.

[11] Patent Number: 6,009,965
[45] Date of Patent: Jan. 4, 2000

[54] TORQUE SHOCK ALLEVIATING DEVICE IN HYBRID VEHICLE

[75] Inventors: Toshikatsu Takanohashi; Kazutomo Sawamura; Teruo Wakashiro; Hiroshi Ohno, all of Wako, Japan

[73] Assignee: Honda Giken Kogyo Kabushiki Kaisha, Tokyo, Japan

[21] Appl. No.: 09/138,531

[22] Filed: Aug. 24, 1998

[30] Foreign Application Priority Data

Aug. 25, 1997 [JP] Japan .................................. 9-227797

[51] Int. Cl.⁷ ....................................................... B60K 6/04
[52] U.S. Cl. ............................ 180/65.2; 60/285; 60/297; 180/65.3; 318/376; 701/22
[58] Field of Search ............................... 60/285, 297, 284, 60/698; 318/376; 701/22, 84, 87; 180/65.2, 65.3, 65.4, 65.8, 65.1

[56] References Cited

U.S. PATENT DOCUMENTS

| | | | |
|---|---|---|---|
| 5,323,868 | 6/1994 | Kawashima | 180/65.4 |
| 5,562,565 | 10/1996 | Moroto et al. | 180/65.6 X |
| 5,680,764 | 10/1997 | Viteri | 60/716 |
| 5,842,534 | 12/1998 | Frank | 180/65.2 |
| 5,848,529 | 12/1998 | Katoh et al. | 60/285 X |
| 5,862,497 | 1/1999 | Yano et al. | 701/22 |
| 5,875,864 | 3/1999 | Yano et al. | 180/65.4 |

FOREIGN PATENT DOCUMENTS

| | | |
|---|---|---|
| 6-108824 | 4/1994 | Japan . |
| 2600492 | 1/1997 | Japan . |

*Primary Examiner*—Michael Mar
*Attorney, Agent, or Firm*—Armstrong, Westerman, Hattori, McLeland & Naughton

[57] ABSTRACT

A torque shock alleviating device in a hybrid vehicle utilizing both an engine and an electric motor as drive sources, whereby a torque shock is not generated when the rich-spiking of the air-fuel mixture is carried out in order to restore the adsorbing ability of an NOx adsorbing device in the hybrid vehicle. When an engine is operated in a lean burn manner, NOx in an exhaust gas is adsorbed to an NOx adsorbing device provided in an exhaust passage. When the adsorbing ability of the NOx adsorbing device reaches a saturated level, a rich-spiking for temporarily enriching the air-fuel mixture of the engine is carried out to restore the adsorbing ability of the NOx adsorbing device. When the output torque from the engine is increased by the rich-spiking, a regenerative braking force is generated in a motor, thereby moderating the increase in output torque from the engine by such regenerative braking force to alleviate the torque shock. An electric power generated by the regenerative braking is supplied for the charging of a battery.

2 Claims, 3 Drawing Sheets

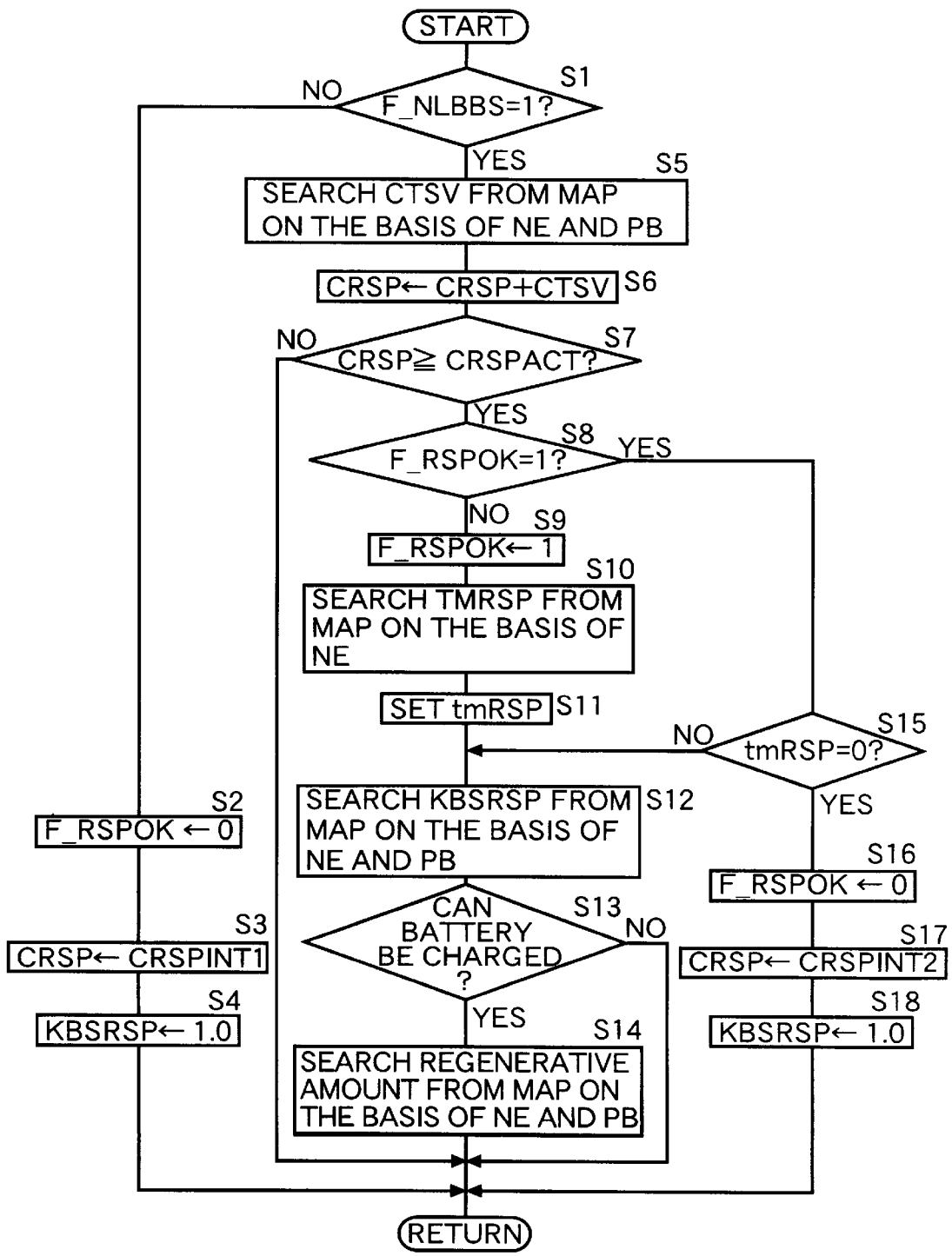

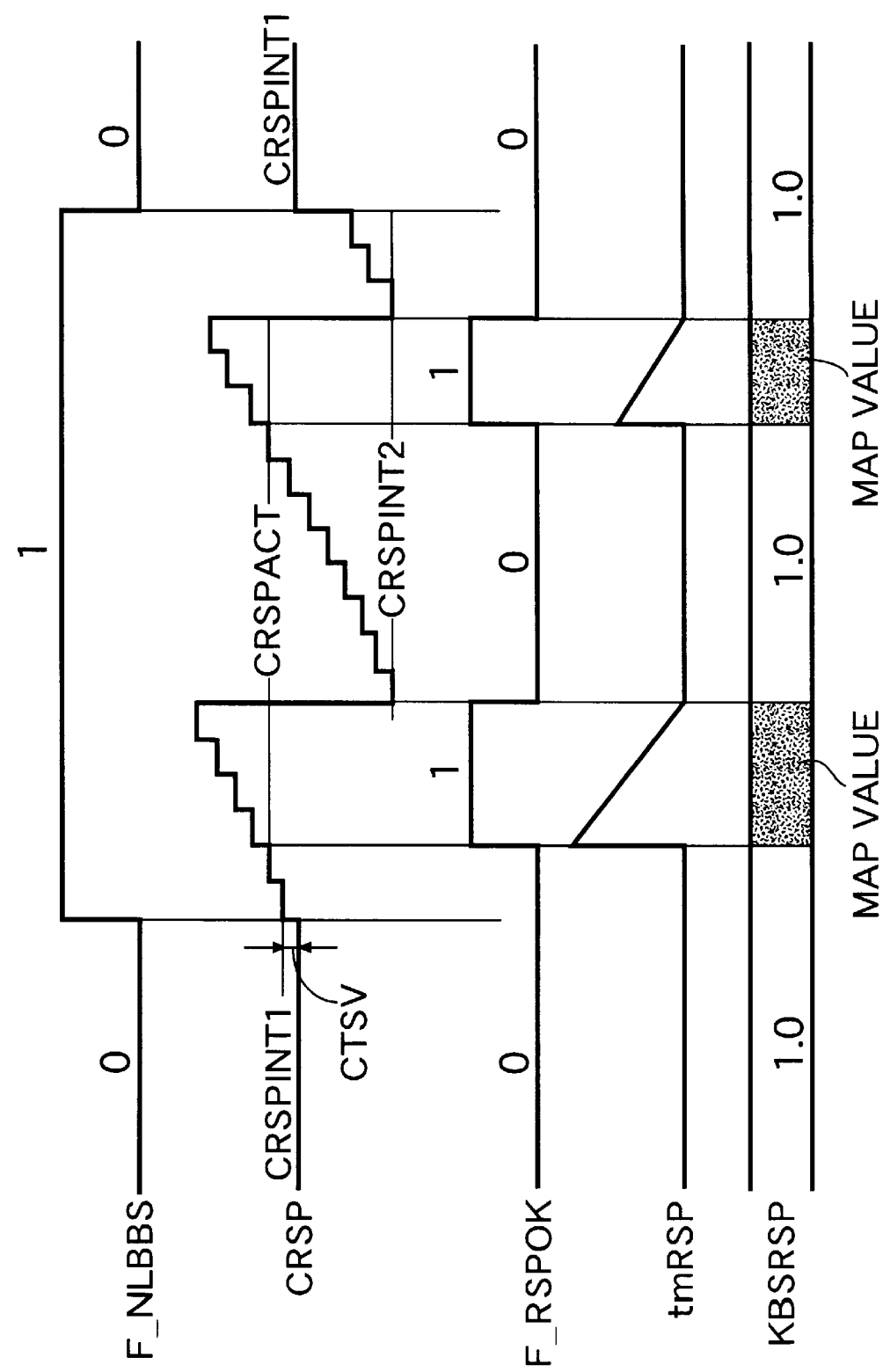

TORQUE SHOCK ALLEVIATING DEVICE IN HYBRID VEHICLE

BACKGROUND OF THE INVENTION

1. Field of the Invention

The present invention relates to a hybrid vehicle including both an engine and an electric motor as drive sources for traveling of the vehicle, and more particularly, to a hybrid vehicle further including an NOx adsorbing device provided in an exhaust passage of the engine.

2. Description of the Related Art

An engine including an NOx adsorbing device provided in an exhaust passage is known from Japanese Patent No. 2600492, in which NOx generated when the engine is operated at a lean air-fuel ratio is adsorbed to the NOx adsorbing device, and when the adsorbing ability of the NOx adsorbing device reaches a saturated level, the air-fuel ratio is temporarily enrichened to restore the adsorbing ability of the NOx adsorbing device. However, when the air-fuel ratio is temporarily enrichened, there arises a problem that a torque shock is generated due to an increase in output torque from the engine.

It is disclosed in Japanese Patent Application Laid-open No. 6-108824, that the variation in output torque from the engine due to the enriching of the air-fuel ratio is moderated by reducing the output torque by any of the following techniques (1) to (3):

(1) Retarding of engine ignition timing;
(2) Fully closing the EACV (an electronic air control valve); or
(3) Fully opening the EGR (an exhaust gas re-circulating device).

However, in the technique for retarding the ignition timing and the technique using the EACV, there is a problem that the amount of decrease in output torque from the engine is not sufficient and, for this reason, the variation in output torque from the engine due to the enrichening of the air-fuel ratio cannot be sufficiently moderated. The technique using the EACV and the technique using the EGR suffer from a problem in that the generation of the torque shock cannot be sufficiently alleviated, because there is a time lag corresponding to a time for which air or an exhaust gas flows when the output torque from the engine is reduced.

The present invention has been accomplished with the above circumstance in view, and it is an object of the present invention to effectively alleviate the torque shock generated during rich-spiking of the air-fuel ratio in a hybrid vehicle including an engine and an electric motor as drive sources for traveling of the vehicle.

SUMMARY OF THE INVENTION

To achieve the above object, in the present invention there is provided a torque shock alleviating device in a hybrid vehicle including an engine which drives a wheel, an electric motor connected to the engine to generate an assisting driving force and a regenerative braking force, an accumulating device which supplies electric power to the motor and which is charged with regenerative power generated by the motor, a motor control device for controlling the assisting driving force and regenerative operations of the motor, an engine control device for controlling the air-fuel ratio of an air-fuel mixture supplied to the engine, and an NOx adsorbing device provided in an exhaust passage to adsorb NOx generated when the air-fuel ratio of the air-fuel mixture supplied to the engine is controlled to be leaned by the engine controlling means, wherein when the adsorbing ability of the NOx adsorbing device reaches a saturated level, the air-fuel ratio is enrichened by the engine control device to release NOx adsorbed to the NOx adsorbing device, wherein the motor control device causes the motor to generate the regenerative braking force upon enrichening of the air-fuel mixture by the engine control device, thereby moderating the variation in output torque from the engine caused by the enrichening of the air-fuel mixture.

With the above feature, when the vehicle is braked during traveling thereof by the engine, or when the engine is generating an excessive driving force, recovery of energy is carried out by generating the regenerative braking force in the motor to charge the accumulating device with the regenerative power. When the driving force of the engine is insufficient, an assisting driving force is generated in the motor by the power from the accumulating device. When the engine is operated with a lean air-fuel mixture in order to reduce the fuel consumption rate, NOx generated in the exhaust gas is adsorbed to the NOx adsorbing device. When the adsorbing ability of the NOx adsorbing device reaches a saturated level, the air-fuel mixture of the engine is enrichened, whereby NOx adsorbed to the NOx adsorbing device is released, but the output torque from the engine is increased due to the enrichening of the air-fuel mixture to generate a torque shock. However, when the air-fuel mixture is enrichened, the regenerative braking force is generated in the motor to moderate the variation in the output torque from the engine. Therefore, it is possible not only to moderate the torque shock, but also to perform the recovery of the energy by the regenerative operation of the motor.

Another feature of the present invention is that, when it is determined that the accumulating means cannot be charged, the motor control device prohibits the regenerative operation of the motor, by monitoring the charge state of the accumulating device.

With the above feature, when the accumulating device cannot be charged, the regenerative operation of the motor is prohibited and therefore, it is possible to avoid the damaging of the accumulating device due to an overcharging.

BRIEF DESCRIPTION OF THE DRAWINGS

FIG. 2 is a flow chart for explaining a rich-spiking operation according to the embodiment of the present invention.

FIG. 3 is a timing chart for explaining the rich-spiking operation according to the embodiment of the present invention.

DETAILED DESCRIPTION OF THE PREFERRED EMBODIMENT

Figure 1:
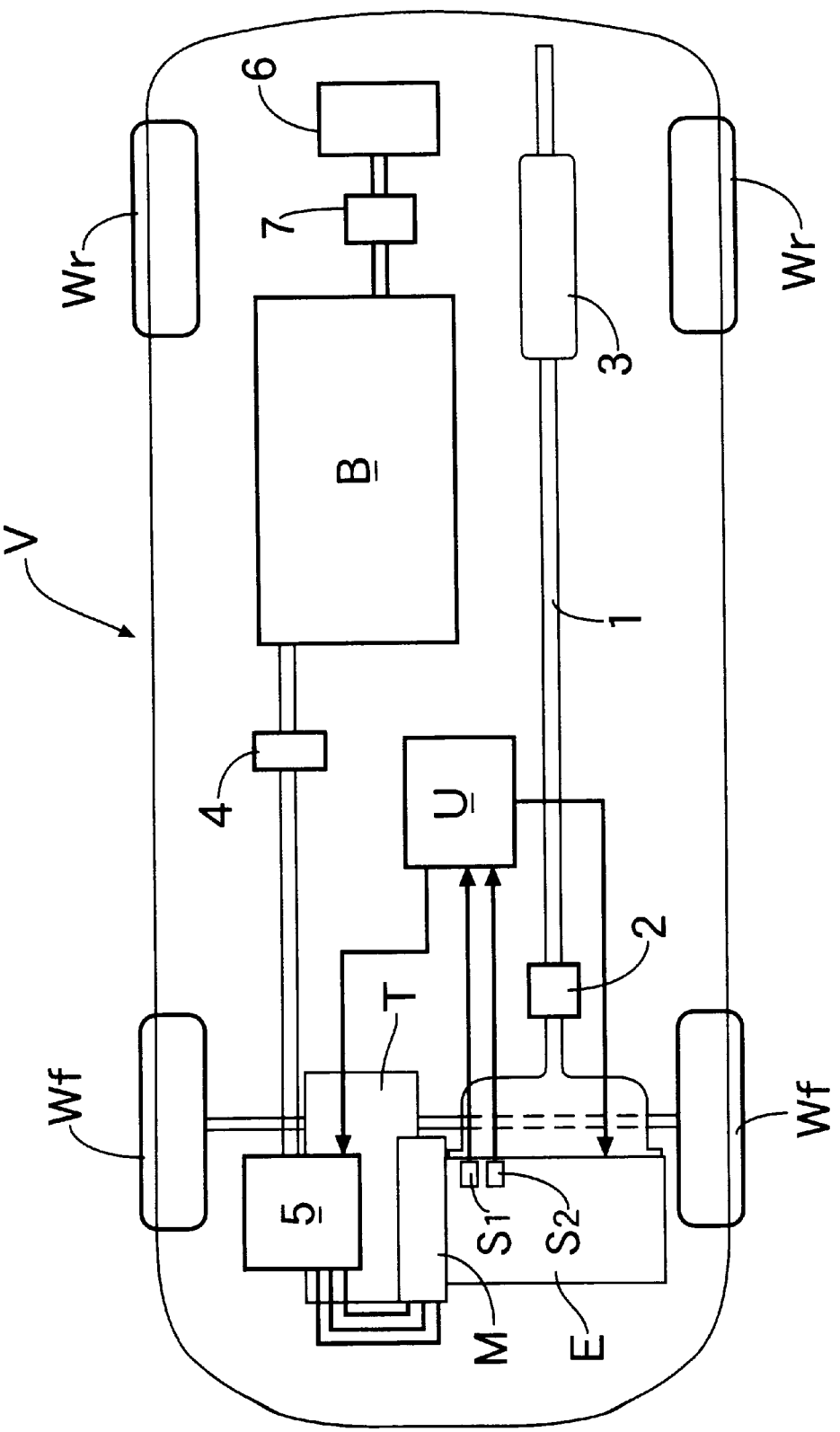
FIG. 1 is an illustration of the entire arrangement of a hybrid vehicle according to an embodiment of the present invention.

The present invention will now be described by way of the preferred exemplary embodiment shown in FIGS. 1–3.

As shown in FIG. 1, a hybrid vehicle V includes a pair of left and right front wheels Wf, Wf which are driving wheels, and a pair of left and right rear wheels Wr, Wr which are follower wheels. A power plant for driving the front wheels Wf, Wf is constructed by connecting an engine E, an electric motor M and a transmission T in series with one another. Provided in an exhaust passage 1 extending from the engine E are an NOx adsorbing device 2 capable of adsorbing NOx in an exhaust gas, and a muffler 3 for reducing exhaust noise. A battery B serves as an electrically chargeable and dischargeable accumulating device and the battery B and the motor M are connected to each other through a contact 4 which opens and closes an electric circuit, and through a power drive unit 5 which consists of a control circuit which includes an inverter and controls the driving and regenerative operations of the motor M. A battery 6 for auxiliaries, to which the battery B is connected, is charged with electric power from the battery B whose voltage is dropped by a downverter 7.

Connected to an electronic control unit U are an engine revolution-number sensor $S_1$ for detecting a number NE of revolutions of the engine and an intake-pipe internal absolute pressure sensor $S_2$ for detecting an internal absolute pressure PB in an intake pipe. The electronic control unit U conducts the control of the driving and regenerative operations of the motor M by the power drive unit 5, and the control of the air-fuel ratio of the engine E. More specifically, when the vehicle is braked during traveling thereof with a driving force from the engine E, or when the engine E is generating an excessive driving force, the battery B is charged with a regenerative power of the motor M to recover energy by generating a regenerative braking force in the motor M through the power drive unit 5. When the driving force of the engine E is insufficient during acceleration of the vehicle or during traveling of the vehicle on an uphill road, the motor M is driven by the power of the battery B through the power drive unit 5 to assist in the driving force of the engine E. The electronic control unit U serves as an engine control device, and the power drive unit 5 serves as a motor control device.

The NOx adsorbing device 2 adsorbs NOx generated in an exhaust gas when the air-fuel ratio of the engine E is controlled to a lean level in order to reduce the fuel consumption rate. When the NOx adsorbing device 2 is saturated in adsorbing ability, the electronic control unit U carries out a rich-spiking operation for temporarily enrichening the air-fuel ratio of the engine E, thereby releasing the adsorbed NOx to restore the adsorbing ability of the NOx adsorbing device 2. When the air-fuel ratio of the engine E is temporarily enrichened in the above manner, the output torque from the engine E is increased to generate a torque shock. However, by generating a regenerative braking force in the motor M with a good timing, the increase in output torque from the engine E can be moderated with such regenerative braking force of the motor M to alleviate the torque shock.

The above-described operation will be further described below with reference to a flow chart in FIG. 2 and a timing chart in FIG. 3.

First, at step S1, a lean burn flag F_NLBBS is referred to determine whether the engine E is in a lean burn state (in which the air-fuel ratio is in a range of 18.0 to 22.0). The air-fuel mixture is controlled to be enrichened, for example, at the start-up of the vehicle and hence, the lean burn flag F_NLBBS is cleared to "0", progressing to step S2. The air-fuel mixture is controlled to be leaned, for example, during cruising of the vehicle and hence, the lean burn flag F_NLBBS is set at "1", progressing to step S5.

When the lean burn flag F_F_NLBBS has been cleared to "0" at step Si to indicate that the engine E is not in the lean burn state, a rich-spiking permitting flag F_RSPOK is cleared to "0" at step S2. The rich-spiking permitting flag F_RSPOK indicates that when the flag F_RSPOK has been set at "1", the air-fuel ratio has been temporarily controlled to the rich level to restore the NOx adsorbing ability of the NOx adsorbing device 2. At subsequent step S3, an NOx-adsorbed amount presuming counter CRSP is set at a first initial value CRSPINT1. The NOx-adsorbed amount presuming counter CRSP presumes an amount of NOx adsorbed in the NOx adsorbing device 2. When the engine E is brought into the lean burn state, the NOx-adsorbed amount presuming counter CRSP starts the counting of the amount of NOx adsorbed from the first initial value CRSPINT1. At subsequent step S4, a rich-spiking air-fuel ratio factor KBSRSP is set at 1.0. When the rich-spiking air-fuel ratio factor KBSRSP is 1.0, the enrichening of the air-fuel ratio by the rich-spiking is not carried out.

Now, when the lean burn flag F_NLBBS has been set at "1" at step S1 to indicate that the engine E is in the lean burn state, an addition value CTSV of the amount of NOx adsorbed is searched at step S5 from a CTSV map on the basis of the engine revolution-number NE and the intake pipe internal absolute pressure PB. At step S6, the addition value CTSV is added to the NOx-adsorbed amount presuming counter CRSP. As a result, the addition value CTSV of the amount of NOx adsorbed, which is determined in accordance with the engine revolution-number NE and the intake pipe internal absolute pressure PB, is added in every loop from the first initial value CRSPINT1. When the NOx-adsorbed amount presuming counter CRSP is equal to or greater than a preset threshold value CRSPACT at subsequent step S7, the processing is advanced to step S8.

When the answer at step S7 is first YES, the rich-spiking permitting flag F_RSPOK is not still set at "1" at step S8. Therefore, the processing is shifted to step S9, at which the rich-spiking permitting flag F_RSPOK is set at "1". At subsequent step S10, a timer set time TMRSP is searched from a TMRSP map on the basis of the engine revolution-number NE, and at step S11, a rich-spiking timer tmRSP is set. The timer set time TMRSP is a time during which the rich-spiking is carried out. The timer set time TMRSP is set such that it is longer when the engine revolution-number NE is low, and it is shorter when the engine revolution-number NE is high. This is because the higher the engine revolution-number NE, the greater the flow of the exhaust gas, and hence, NOx adsorbed to the NOx adsorbing device 2 is released promptly by the rich-spiking.

At step S12, the rich-spiking air-fuel ratio factor KBSRSP is searched from an air-fuel ratio map on the basis of the engine revolution-number NE and the intake pipe internal absolute pressure PB. NOx adsorbed to the NOx adsorbing device 2 is released by enrichening the air-fuel mixture of the engine E on the basis of the rich-spiking air-fuel ratio factor KBSRSP. At subsequent step S13, it is determined whether the battery B can be charged. If the battery B can be charged, a regenerative amount of the motor M is searched from a map on the basis of the engine revolution-number NE and the intake pipe internal absolute pressure PB at step S14, and the regenerative control of the motor M is carried out to provide such regenerative amount. As a result, the output torque from the engine E which has been increased by the rich-spiking can be moderated by the regenerative braking force of the motor M to alleviate the generation of the torque shock. The regenerative braking force of the motor M has a sufficient magnitude and is generated immediately without a time lag and hence, the torque shock due to the increase in output torque from the engine E can be alleviated effectively. Moreover, the output torque from the engine E which has been increased by the rich-spiking can be recovered as electric energy into the battery B. The electric energy recovered into the battery B is utilized to drive the motor M to assist in the driving force of the engine E during acceleration of the vehicle and the like.

In the determination of whether the battery B can be charged, when the maximum voltage of the battery B is, for example, 180 volts, 150 volts equal to about 80% of the maximum voltage is defined as a reference voltage. When the battery voltage is less than the reference voltage of 150 volts, it is determined that the battery B can be charged, and when the battery voltage is equal to or greater than the reference voltage, it is determined that the battery B cannot be charged. Thus, damage to the battery B as a result of over-charging can be avoided. The regenerative amount of the motor M during the rich-spiking is set, so that it is greater, as the engine revolution-number NE is greater and the intake pipe internal absolute pressure PB is greater.

In a next loop, the rich-spiking permitting flag F_RSPOK had been already set at "1" at step S8 and hence, the processing is shifted to step S15. If the rich-spiking timer tmRSP set at step S11 is counting at step S15, steps S12 to S14 are repeated to continue the rich-spiking operation and the regenerative operation of the motor M. If the counting time of the rich-spiking timer tmRSP elapses at step S15, i.e., if it is determined that the NOx adsorbing ability of the NOx adsorbing device 2 has been restored, the processing is advanced to step S16, at which the rich-spiking permitting flag F_RSPOK is cleared to "0". At step S17, the NOx-adsorbed amount presuming counter CRSP is set at a second initial value CRSPINT2 and further, at step S18, the rich-spiking air-fuel ratio factor KBSRSP is restored to 1.0.

As can be seen from FIG. 3, the second initial value CRSPINT2 is set less than the first initial value CRSPINT1. The reason is as follows: When the air-fuel ratio of the air-fuel mixture for the engine E is changed over from the rich level to the lean level, a certain amount of NOx has been already adsorbed to the NOx adsorbing means 2. Therefore, the counting value of the NOx-adsorbed amount presuming counter CRSP reaches the threshold value CRSPACT earlier to start the rich-spiking by setting the first initial value CRSPINT1 at a higher level in consideration of the amount of NOx adsorbed. After the rich-spiking has been carried out once, it is ensured that the adsorbing ability of the NOx adsorbing device 2 has been completely restored. Therefore, the capacity of the NOx adsorbing device 2 can be satisfactorily utilized by setting the second initial value CRSPINT2 at a lower level.

Although a preferred exemplary embodiment of the present invention has been described in detail, it will be understood that the present invention is not limited to the above-described embodiment, and various modifications in design may be made without departing from the subject matter of the present invention.

For example, the battery B may be replaced by a capacitor. In addition, it may be determined whether the battery can be charged on the basis of the remaining capacity of the battery B in place of the basis of the voltage of the battery B.

What is claimed:

1. A torque shock alleviating device in a hybrid vehicle comprising:

an engine which drives at least one wheel;

a motor connected to said engine to generate an assisting driving force and a regenerative braking force;

an accumulating device for supplying electric power to said motor the accumulating device being charged with electric power generated by said motor during regenerative braking operations, a motor control device for controlling the assisting driving force and the regenerative braking operations of the motor;

an engine control device for controlling an air-fuel ratio of an air-fuel mixture supplied to said engine; and an NOx adsorbing device provided in an exhaust passage for adsorbing NOx generated when the air-fuel ratio of the air-fuel mixture supplied to said engine is controlled to a lean level by said engine controlling device, wherein when the adsorbing ability of the NOx adsorbing device reaches a saturated level, the air-fuel ratio of the air-fuel mixture is temporarily enrichened by the engine control device to release NOx adsorbed by said NOx adsorbing device, wherein said motor control device causes said motor to generate said regenerative braking force upon enrichening of the air-fuel mixture by said engine control device, thereby moderating the variation in output torque from said engine caused by the enrichening of the air-fuel mixture.

2. The torque shock alleviating device in a hybrid vehicle according to claim 1, wherein, said control device monitors the charged state of said accumulating device and prohibits the regenerative braking operation of said motor, whenever the charged state exceeds a predetermined level.

* * * * *